(12) United States Patent
Isberg et al.

(10) Patent No.: US 9,165,084 B2
(45) Date of Patent: Oct. 20, 2015

(54) ADAPTIVE SELECTION OF A SEARCH ENGINE ON A WIRELESS COMMUNICATION DEVICE

(75) Inventors: Anders Isberg, Åkarp (SE); Lotta Willstedt, Lomma (SE); Johan Fredrik Jonas Gulliksson, Bjärred (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1261 days.

(21) Appl. No.: 12/630,908

(22) Filed: Dec. 4, 2009

(65) Prior Publication Data

US 2011/0137885 A1    Jun. 9, 2011

(51) Int. Cl.
  *G06F 7/00*    (2006.01)
  *G06F 17/30*   (2006.01)

(52) U.S. Cl.
  CPC ................. *G06F 17/30905* (2013.01)

(58) Field of Classification Search
  CPC ............ G06F 17/30864; G06F 17/30386; G06F 17/30867; G06F 17/3053; G06F 17/30091
  See application file for complete search history.

(56) References Cited

U.S. PATENT DOCUMENTS

2008/0243785 A1*  10/2008  Stading ..................... 707/3

FOREIGN PATENT DOCUMENTS

EP    1956503 A2    8/2008

OTHER PUBLICATIONS

International Search Report mailed Mar. 23, 2011 in re International Application PCT/IB2010/002824.
Mozillazine: "Mosilla Firefox 2 Release", Oct. 24, 2006, pp. 1-3, XP002627729.
Vaughan-Nichols, S. J., "The Mobile Web Comes of Age", Computer, IEEE Service Center, Los Alamitos, CA, US, vo. 41, No. 11, Nov. 1, 2008, pp. 5-17, XP011237847.
Ellermann, Xyzzy F., "The application opensearchdescription +xml media type; draft-ellermann opensearch-01. txt" , Internet Engineering Task Force, IETF; Standardworkingdraft, Internet Society (ISOC) 4, Rue Des Falaises Ch-1205 Geneva, Switzerland, No. 1, Jul. 3, 2008, pp. 1-8, XP015057613.

* cited by examiner

*Primary Examiner* — Truong Vo
(74) *Attorney, Agent, or Firm* — Coats & Bennett, PLLC

(57) ABSTRACT

A wireless communication device communicates with a web site over an established communication link. The device includes a controller that automatically detects whether the website provides a search engine for use by a user. If the web site provides search engine, a controller at the device configures an adaptive, context-sensitive search function of the browser to receive user input, and to perform a search based on the user input. A user interface includes a display to display the results of the search.

13 Claims, 9 Drawing Sheets

```
<html xmlns="http://www.w3.org/1999/xhtml" xml:lang="sv"/>    ⟵ 110
<head>
    <link rel="search" type="application/opensearchdescription+xml"
    href="http://sok.aftonbladet.se/tools/opensearch.xml" title="Sök på Aftonbladet.se"
    />
    .   .   .   .
</head>
</html>
```

FIG. 7A

```
<?xml version="1.0" encoding="UTF-8" ?>
<OpenSearchDescription xmlns="http://a9.com/-/spec/opensearch/1.1/"/>
    <ShortName>Aftonbladet.se</ShortName>
    <Description>Sök på Aftonbladet.se</Description>
    <InputEncoding>UTF-8</InputEncoding>
    <Image height="16" width="16" type="image/x-icon">http://www.aftonbladet.se/favicon.ico</Image>
    <Url type="text/html" method="GET" template="http://sok.aftonbladet.se/?q={searchTerms}" />
    <SearchForm>http://sok.aftonbladet.se/</SearchForm>
</OpenSearchDescription>
```

FIG. 7B

ADAPTIVE SELECTION OF A SEARCH ENGINE ON A WIRELESS COMMUNICATION DEVICE

BACKGROUND

The present invention relates generally to wireless communication devices, and particularly to wireless communication devices, such as cellular telephones, capable of accessing the Internet.

Many consumer electronic devices, such as Personal Computers (PCs) and wireless communication devices, include a browser application for allowing a user to access web pages via the Internet. Typically, browser applications present the user with a Graphical User Interface (GUI) to facilitate interaction with the web page. However, not all browsers present the GUI in the same way. The GUI for a browser executing on a PC, for example, usually has a dedicated field for receiving a string representing a Uniform Resource Locator (URL), and another, separate field for receiving strings representing search terms and keywords. However, because of the size of the display and/or other constraints, browser applications executing on many wireless communication devices, such as cellular telephones for example, provide only a single input field for receiving both a URL and a search string. To determine whether the user enters a URL or a search term into the input field, the browser application analyzes the syntax of the input string. If the input string represents a URL, the browser application resolves the URL and downloads the corresponding web page for display. If the input string is a search term, the browser application generates a search query including the search term, and sends the query to a predefined search service provider such as GOOGLE or MSN or BING, for example.

In many cases, browser applications will provide the user with a list of suggestions to assist a user in locating a desired web page or other information source. The suggestions are usually based on the alpha-numeric characters input by a user, and may be refined as the user enters new characters into the input field. The source of data for generating the suggestions on the list can be information stored on the user's device. Conventionally, these sources include a predictive text input database, a list of previously visited URLs, and bookmarks stored in memory. The source for generating the list may also be provided by an application executing on an external server. One such example is a suggestion service like GOOGLE SUGGEST. With such suggestion mechanisms, a user is able to locate a desired information source relatively quickly and with a limited number of key presses. Therefore, the user receives a highly optimized experience.

SUMMARY

The present invention provides a wireless communication device, such as a cellular telephone, for example, that includes a browser application having an adaptive, context-sensitive search function. Particularly, the browser application configures itself to use different search engines for different contexts (e.g., different web sites).

In one embodiment, a wireless communication device configured according to the present invention includes a browser plug-in module that extends the search capabilities of the browser to include the adaptive context-sensitive search function. When a user visits a web site, the device establishes a communication link with a server that hosts the web site. After establishing the link, the web site downloads code to the user's browser representing a web page. The code may be, for example, HyperText Markup Language (HTML) code.

Some web sites provide a search engine and/or a suggestion service that user can employ to search for data and information on that web site. Those that do may provide an indicator embedded within the HTML code downloaded to the user. The indicator, which may be meta data, identifies a file that defines the capabilities and the interface of the web site's search engine and suggestion service. The plug-in module will automatically determine if the web site provides its own search engine by parsing the received code. If an indicator is found, the plug-in module will configure the browser such that when a user invokes the browser search function, it will perform a search using the detected search engine and display the search results to the user. This differs from conventional devices in which the user can only invoke the web site search engine and suggestion services from a field provided by the web site.

Accordingly, one embodiment of the present invention provides for a method of selecting a search engine on a wireless communication device. The method comprises establishing a communication link between a wireless communication device and a network server hosting a web site, automatically detecting, at the wireless communication device, whether the web site provides a search engine based on data received from the web site, configuring a browser application executing on the wireless communication device to perform a search using the detected search engine responsive to detecting that the web site provides the detected search engine, and displaying the results of the search at the wireless communication device.

In one embodiment, automatically detecting whether the web site provides a search engine comprises determining whether the data received from the network server includes an embedded indicator.

In one embodiment, the embedded indicator comprises meta data received from the web site via the established communication link.

In one embodiment, the embedded indicator identifies a file that defines the search capabilities of the detected search engine.

In one embodiment, the method comprises downloading the search capabilities of the detected search engine, and storing the search capabilities in memory on the wireless communication device.

In one embodiment, the method comprises the browser application configuring itself to perform a search using the detected search engine by receiving user input at an input field of the browser application, generating a message to include the user input as one or more search parameters, sending the message to the detected search engine at the web site, and receiving the results of the search at the wireless communication device.

In one embodiment, the method further comprises also storing a search capability file in memory of the wireless communication device for each web site visited by the user that provides a search engine.

In one embodiment, the method comprises the browser application generating a list of search engines based on one or more of the search capability files stored in memory, displaying the list to the user at the wireless communication device, selecting a search engine from the list responsive to user input, and configuring itself to perform the search using the selected search engine.

In another embodiment, the present invention provides a wireless communication device comprising, a communication interface to communicate with a web site via an established communication link, a controller configured to establish the communication link between the communication interface and a network server hosting the web site, automatically detect whether the web site provides a search engine based on data received from the web site, configure a browser application executing on the wireless communication device to perform a search using the detected search engine, and a user interface to display the results of the search.

In one embodiment, the wireless communication device automatically detects whether the web site provides a search engine by determining whether the data received from the network server includes an embedded indicator.

In one embodiment, the embedded indicator comprises meta data received from the web site via the established communication link.

In one embodiment, the embedded indicator identifies a file that defines the search capabilities of the detected search engine.

In one embodiment, the controller is configured to download the search capabilities of the search engine from the web site, and store the search capabilities of the detected search engine in memory.

In one embodiment, the wireless communication device further receives user input at an input field of the browser application, generates a message to include the user input as one or more search parameters, sends the message to the detected search engine at the web site, and receives the results of the search at the wireless communication device.

In one embodiment, the device stores a search capability file in memory for each web site visited by the user that provides a search engine.

In one embodiment, the device generates a list of search engines based on one or more of the search capability files stored in memory, displays the list to the user at the wireless communication device, selects a search engine from the list responsive to user input, and configures the browser application to perform the search using the selected search engine.

The present invention also provides a wireless communication device comprising a communication interface to communicate with a web site via an established communication link, memory to store instructions comprising a browser application, and a controller configured to execute the browser application to establish the communication link between the communication interface and a network server hosting the web site, and configure a context-sensitive search function at the browser application to perform a search using a search engine identified by the web site.

In one embodiment, the controller is further configured to execute the browser application to store information identifying the search capabilities of the search engines of one or more web sites in memory, display a list of the search engines based on the stored search capabilities, identify a selected search engine from the list, and re-configure the search function at the browser to perform a search using the search engine selected from the list.

In one embodiment, the wireless communication device also comprises a module that interfaces with the browser application to configure the context-sensitive search function at the browser application to use the detected search engine.

BRIEF DESCRIPTION OF THE DRAWINGS

FIGS. 7A-7B illustrate exemplary meta data suitable for use in one embodiment of the present invention.

DETAILED DESCRIPTION

Most wireless communication devices have browser applications that provide a user with a search function. Conventionally, a user must pre-configure the browser applications to employ a specific search engine by identifying the specific search engine in his or her preferences. This specified search engine will then be used each time the browser's search engine function is invoked until the user re-configures the browser to employ a different search engine.

The present invention, however, extends the functionality of these conventional browser applications executing on a mobile communication device. Particularly, the present invention provides a browser application, such as INTERNET EXPLORER, SAFARI, CHROME, or FIREFOX, for example, with an adaptive, context-sensitive search function. According to the present invention, the browser application configures itself to use different search engines for different contexts (e.g., different web sites). More specifically, the browser stores information in memory defining the capabilities of the search engines and suggestion services provided by a given web site in memory. Whenever the user invokes the browser search function, the browser directly utilizes the stored capability data to configure itself to use that search engine and to allow the user to perform the search with that search engine. This helps the user to optimize a given search to retrieve data and information provided by a given web site while allowing the user to perform the search from the more familiar browser.

Figure 1:
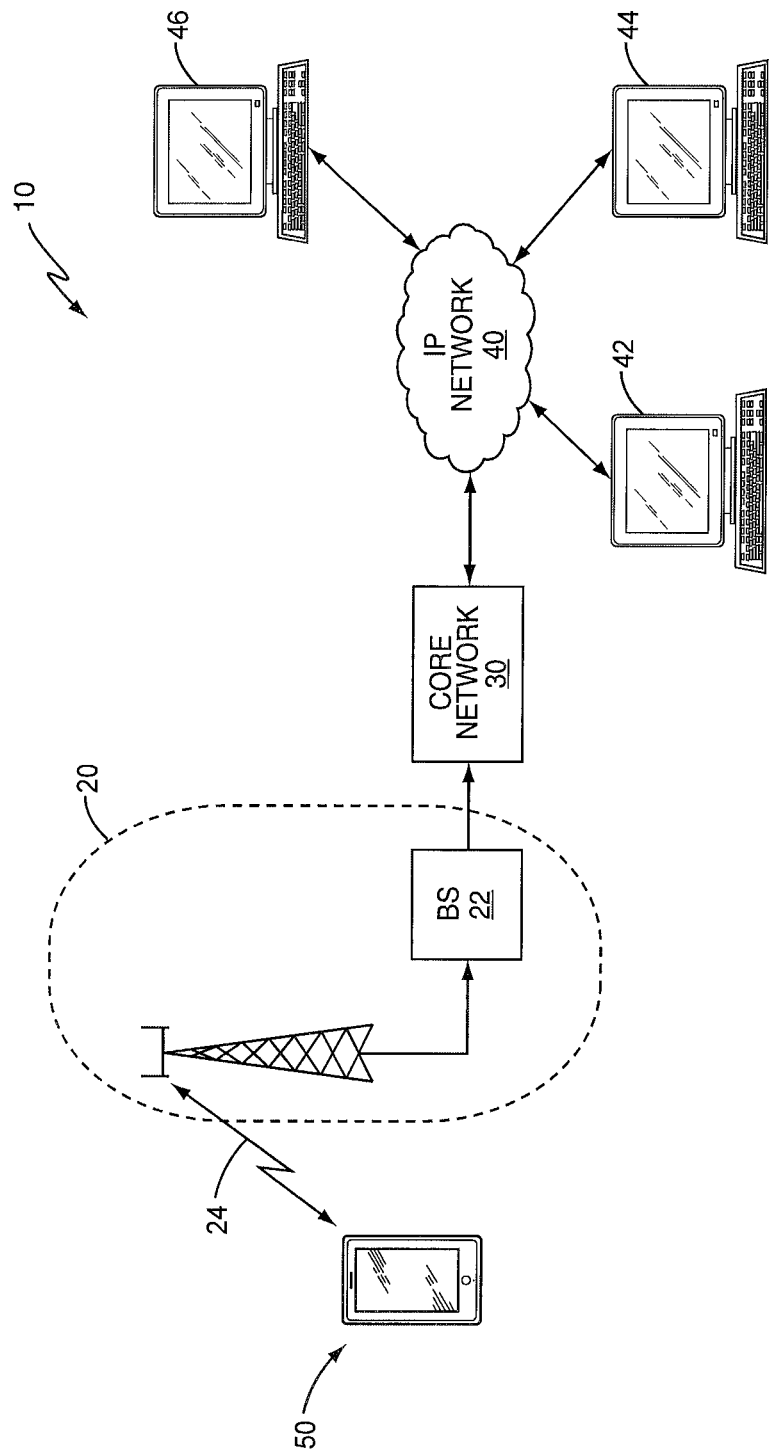
FIG. 1 is a block diagram illustrating an exemplary mobile communications network suitable for use in one embodiment of the present invention.

FIG. 1 is a functional block diagram illustrating an exemplary mobile communications network 10 suitable for use in one embodiment of the present invention. Although the present invention is described herein in the context of a mobile communication network 10, those skilled in the art will appreciate that the present invention may also be used in fixed communication networks.

Mobile communication network 10 comprises a radio access network (RAN) 20 and a core network (CN) 30. Although not specifically shown, those skilled in the art will appreciate that some networks 10 may also include an IP Multimedia Subsystem (IMS), the Public Switched Telephone Network (PSTN), and/or the Integrated Digital Services Network (ISDN). The functions and operations of RAN 20 and CN 30 are generally well-known in the art. Therefore, only a brief description of their functionality is included here for context.

The RAN 20 includes one or more base stations (BS) 22 that support radio communications with a wireless communication device 50 over an air interface 24. The air interface 24 may be, for example, an interface defined by the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX). In one embodiment, the air interface may comprise a Wireless Local Area Network (WLAN) 802.11x interface. Generally, a communication network such as network 10 will contain more than one RAN 20; however, for simplicity's sake, only one RAN 20 is shown in FIG. 1.

The CN 30 provides a connection to the Internet 40 or other packet data networks (PDN) for packet switched services such as web browsing and email for example. The CN 30 may comprise a General Packet Radio Services (GPRS) network, a cdma2000 network, or a Universal Mobile Telecommunications System (UMTS) network, for example. Usually, the CN 30 will include one or more access gateways that interconnect the CN 30, and thus, the wireless communication device 50, to the Internet 40, as well as to one or more other communication networks. Examples of these networks include, but are not limited to, an IMS (not shown) and the PSTN (not shown). A user of device 50 may access web sites hosted by one or more servers 42, 44, 46 via RAN 20 and CN 30. As described in more detail later, one or more of these web-sties may provide access to their own "local" search engine/suggestion service to assist a user in locating data or information on that web-site.

Figure 2:
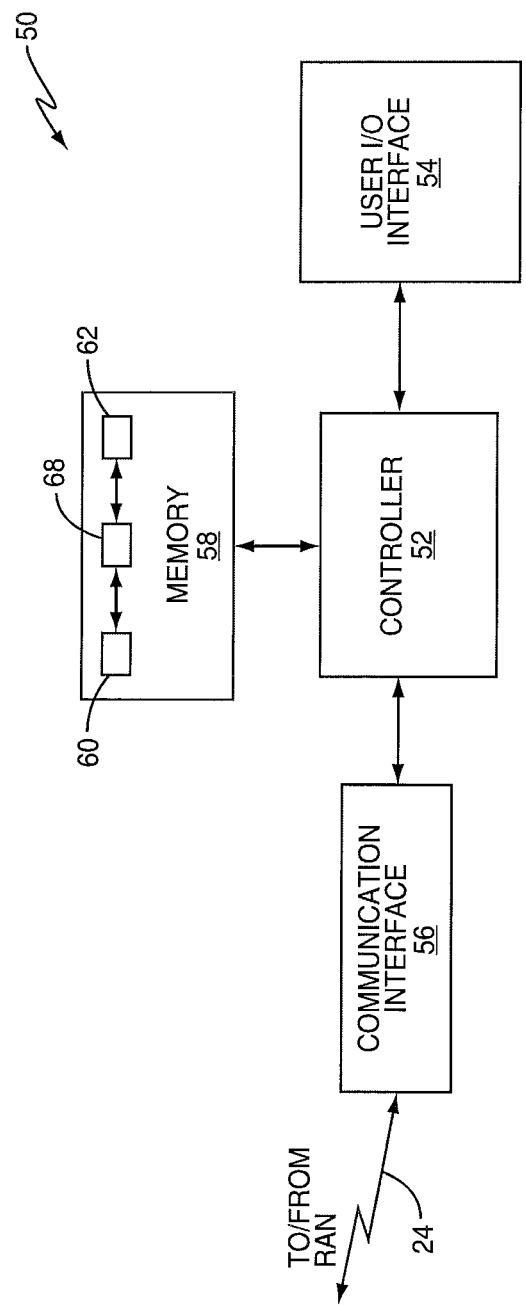
FIG. 2 is a block diagram illustrating some of the components of a wireless communication device configured to operate according to one embodiment of the present invention.

FIG. 2 is a block diagram illustrating some of the functional components of a wireless communication device 50 configured according to one embodiment of the present invention. Device 50, which in this embodiment is a cellular telephone, comprises a programmable controller 52, a user input/output interface 54, a communications interface 56, and a memory 58. Controller 52 generally controls the overall operation of device 10 according to programs and instructions stored in memory 58. The controller 52, which may be implemented in hardware, firmware, software, or a combination thereof, may comprise a single microprocessor or multiple microprocessors. The microprocessors may be general purpose microprocessors, digital signal processors, or other special purpose processors. The controller 52 executes the instructions in the mobile browser application 60 to allow the user to download and view content from a web site hosted by one or more of the servers 42, 44, 46.

The User Interface (UI) 54 includes one or more user input devices and a display to enable the user to interact with and control the device 50. The UI 54 may include input/output devices such as a keypad, touchpad, joystick control dials, control buttons, display, speaker, microphone, or a combination thereof. The display may be, for example, a touch-sensitive display although it is not required for practicing the present invention. In fact, any type of display is suitable. However, a touch-sensitive display is beneficial because it provides the user with the ability to view and interact with various data, menus, and commands by touch.

The communication interface 56 allows the device 50 to communicate messages and other data with one or more remote parties and/or servers 42, 44, 46. In this embodiment, the communication interface 56 comprises a fully functional cellular radio transceiver that can operate according to any known standard, including the standards known generally as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX). In other embodiments, however, the communication interface 56 comprises a hardware port, such as an Ethernet port, for example, that connects device 50 to a packet data communications network. In yet another embodiment, the communication interface 56 may comprise a wireless LAN (802.11x) interface.

Memory 58 comprises a computer-readable medium that may include both random access memory (RAM) and read-only memory (ROM). Although not specifically shown, those skilled in the art will appreciate that the memory 58 also includes other hardware components, such as compact disks (CDs), hard drives, tapes, and digital video disks (DVDs). Computer program instructions and data required for operation are stored in non-volatile memory, such as EPROM, EEPROM, and/or flash memory, which may be implemented as discrete devices, stacked devices, or integrated with the controller 52. One such computer program is a mobile browser application 60 and plug-in 68. When executed by controller 52, the plug-in module 68 allows the user to interact with web pages via the Internet. Additionally, memory 58 also stores a library 62 accessible to the plug-in module 68. The library 62 comprises data and information defining the capabilities of the search engines and suggestion services provided by the web-sites visited by the user. As described in more detail later, the plug-in module 68 saves the capability information in memory 58 whenever the user visits a web site. The plug-in module 68 also utilizes a search engine/suggestion service selected by the user from the library 62.

Figure 3:
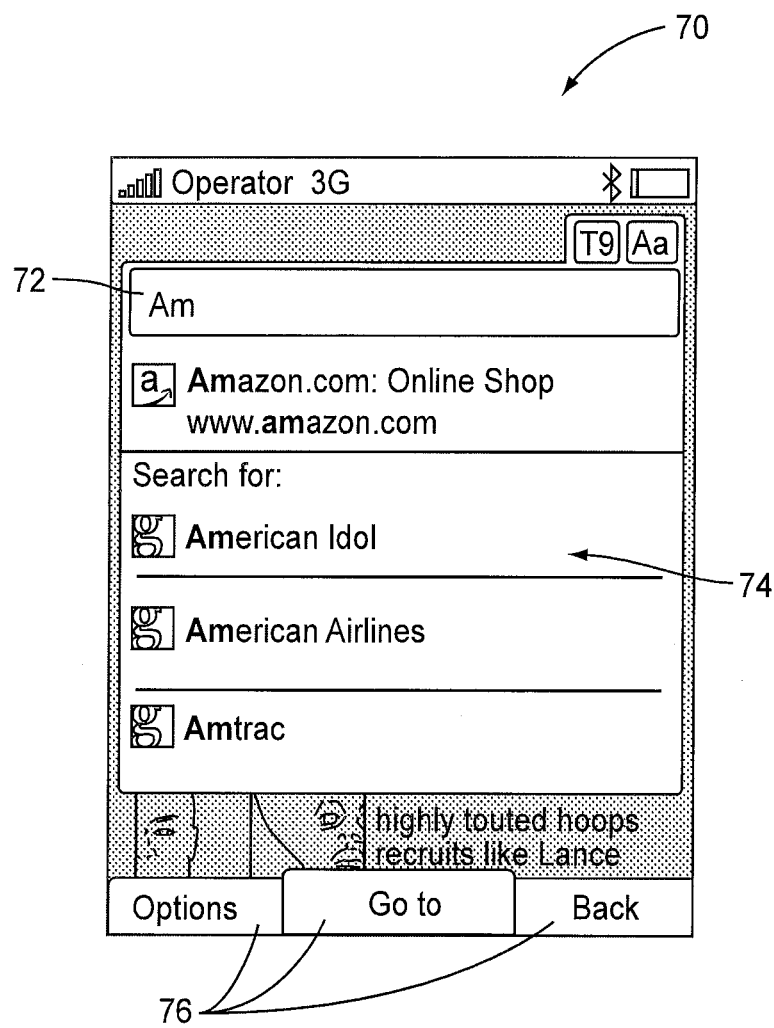
FIG. 3 is a perspective view of a display on a wireless communications device showing a search input field with suggestions on a Graphical User Interface (GUI) of a browser.

Many mobile browser applications allow a user to search the Internet 40 for particular subject matter. FIG. 3 is a perspective view of a GUI 70 for one such conventional browser. As seen in FIG. 3, GUI 70 executes on a wireless communication device, such as a cellular telephone. Because of display space limitations, the GUI 70 provides a combined input field 72 into which a user may enter a URL or one or more terms to be used in a search. A results area displays a list 74 of suggestions based on the data input into the combined input field 72. One or more control objects such as tabs 76 may also be present to allow the user to navigate the GUI 70.

In use, a user may enter a URL into the combined input field 72 to identify the address of a particular web site, or may enter a term or phrase that will serve as the basis for a search. The browser application would then determine whether the user entered a URL or a search term based on an analysis of the entered string. For example, the browser application may parse the input string to determine whether certain pre-defined elements are present. If the user entered one or more pre-defined elements (e.g., "www," "http," ".com" ".org," etc.), then the browser would determine that the user entered a URL and establish a connection with the associated web site. If a pre-defined element is not detected, however, the GUI 70 would determine that the user entered one or more search terms. Based on the input, the browser would automatically offer the user some suggestions to assist the user.

FIG. 3 illustrates the browser providing the user with a search input field provided and some suggestions matching a partial search term. As seen in FIG. 3, the user entered the characters "Am" of a search term into the combined input field 72. The list of suggestions 74, each starting with the letters "Am," appears in the results area for display to the user. The source for generating this list 74 may come from information stored on the user's device such as a predictive text input database, a list of previously visited URLs, or bookmarks, for example. The suggestions on the list 74 may be refined as the user continues to enter additional characters into the combined input field 72. Each suggestion in the list 74 is a hyperlink that points to associated information. Thus, when the user sees a desired hyperlink on list 74, the user need only to select that link to access the information associated with the selected suggestion.

Figure 4:
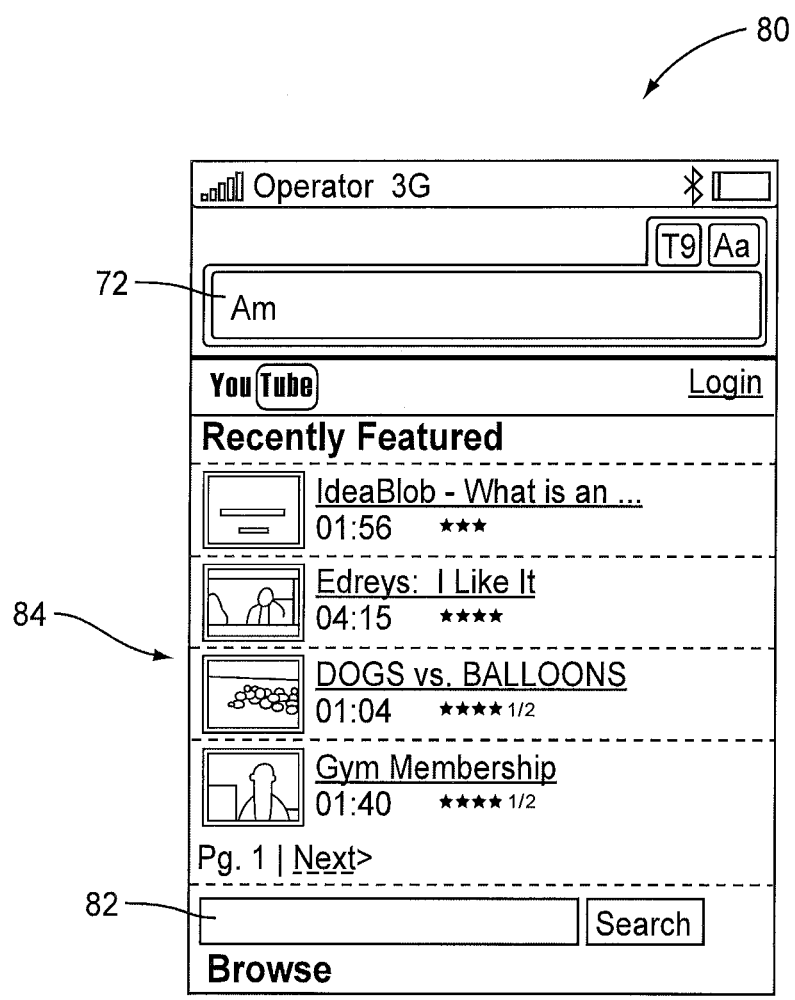
FIG. 4 is a perspective view of a display screen on a wireless communications device showing a web page as displayed on a browser.

FIG. 4 illustrates a conventional browser as it might appear when a user invokes a search engine provided by a web site. Particularly, the user is presented with a web page 80, which has an input field 82 used for searching the web site. The input field 82 differs from the combined input field 72 in several ways. Although both accept alpha-numeric data, the input field 82 is provided by the web site visited by the user, while the browser application 60 executing on the user's device 50 provides the combined input field 72.

Upon entering alpha-numeric data into the input field 82, the "local" search engine/suggestion service provided the web site may assist the user by determining a list 84 of suggested files or information based on the user-supplied characters. As before, the list of suggestions is displayed list 84. Each suggestion in the list 84 may comprise a link that points to associated information. Simply by selecting a desired result from the list 84, the user can access the desired information.

Both the conventional browser application executing on the user's local device 50, and the web site, provide helpful search engines and suggestion services to assist a user in locating particular data. However, there are trade-offs when using one over the other. For example, given the typically reduced size of the display on such mobile devices 50, one benefit of using the browser to search for data and information is ease of use. The user is usually more familiar with the layout of the browser application than with the layout of a given web page. Further, the combined input field 72 is generally prominently displayed for the user. This familiarity makes it easier for the user to locate and use the combined input field 72 than it would be to locate a search field, such as input field 82, on a web page.

On the other hand, a benefit of the search/suggestion services provided by the web site is that they can effectively reduce the scope of data that the user needs to search for a given site. This is because the browser with its combined input field 72 is not limited to any specific search service, and thus, may use multiple search services to search the Internet. The search engines/suggestion services provided by the web site, in contrast, are "local" to the given web site. Therefore, these "local" services are often optimized for searching the particular subject matter hosted on the server. For example, if server 42 hosted a video sharing web site, such as YOUTUBE, the search engine/suggestion service hosted by that web site would specifically search its own video database for video clips rather than search multiple databases over the Internet. Thus, the search/suggestion service provided by server 42 would be less likely to produce results directed to unrelated documents and information.

The present invention extends the functionality of the browser 60 executing on the device 50 to selectively utilize the more specific information available with one or more of the search/suggestion services offered by the web sites. More particularly, the browser application 60 includes an adaptive, context-sensitive search function that allows the browser 60 to configure itself to use the different search engines for different contexts (e.g., different web sites). The browser 60 is able to directly utilize the search/suggestion services provided by the web pages using data and search terms input into the combined input field 72. That is, the present invention does not require the user to employ an input field provided by the web site being visited. Rather, the user can invoke the same search/suggestion service provided by the web-site from the combined input field 72 on the browser 60. This helps the user to optimize a given search to retrieve data and information provided by a given web site while allowing the user to perform the search from the more familiar browser 60.

Figure 5:
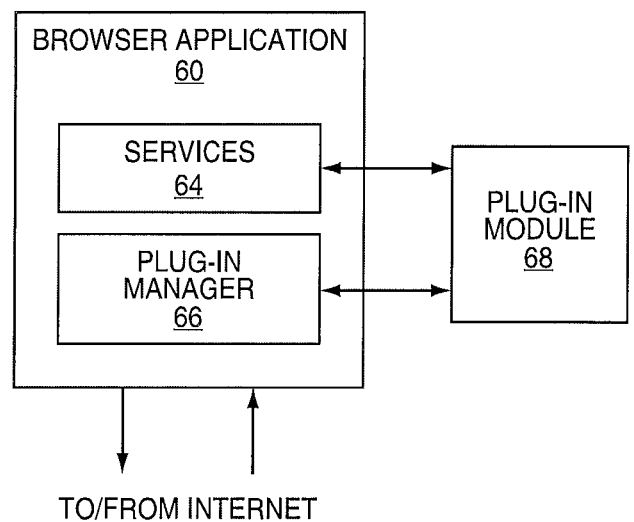
FIG. 5 illustrates a block diagram illustrating some of the component modules that facilitate the interaction of a plug-in module and a browser application executing on a user's wireless communication device.

As seen in FIG. 5, one embodiment of the present invention accomplishes this by providing a plug-in module 68 for the browser 60. Those skilled in the art should realize that, although the specification uses the term "plug-in" specifically, it is meant as a generic term for other types of add-on modules or software extensions including, but not limited to, add-in and snap-in modules.

Plug-in module 68 is a relatively small piece of software code written to perform a particular function. In one embodiment, plug-in module 68 contains code that, when executed by controller 52, automatically configures the browser 60 to detect and save information defining the capabilities of a "local" search engine/suggestion service provided by a web site visited by the user. The plug-in module 68 also configures the browser 60 to utilize one or more of the suggested services specified by the web site whenever the user invokes the browser's search function from the combined input field 72.

As seen in FIG. 5, plug-in module 68 generally interfaces with a service module 64 and a plug-in manager 64 of browser 60. The service module 64 provides the services that the plug-in module 68 can use. This includes, but is not limited to, the means by which plug-in 68 can register itself with browser 60, and informing the plug-in module 68 of a protocol to facilitate the exchange of data between browser 60 and plug-in module 68. The plug-in manager 66 also interfaces with the plug-in module 68, and functions to manage all of the plug-in modules interfacing with the browser application 60. By way of example, plug-in manager 66 operates to facilitate the installation/un-installation of plug-in module 66, as well as its activation/de-activation by the user.

Figure 6:
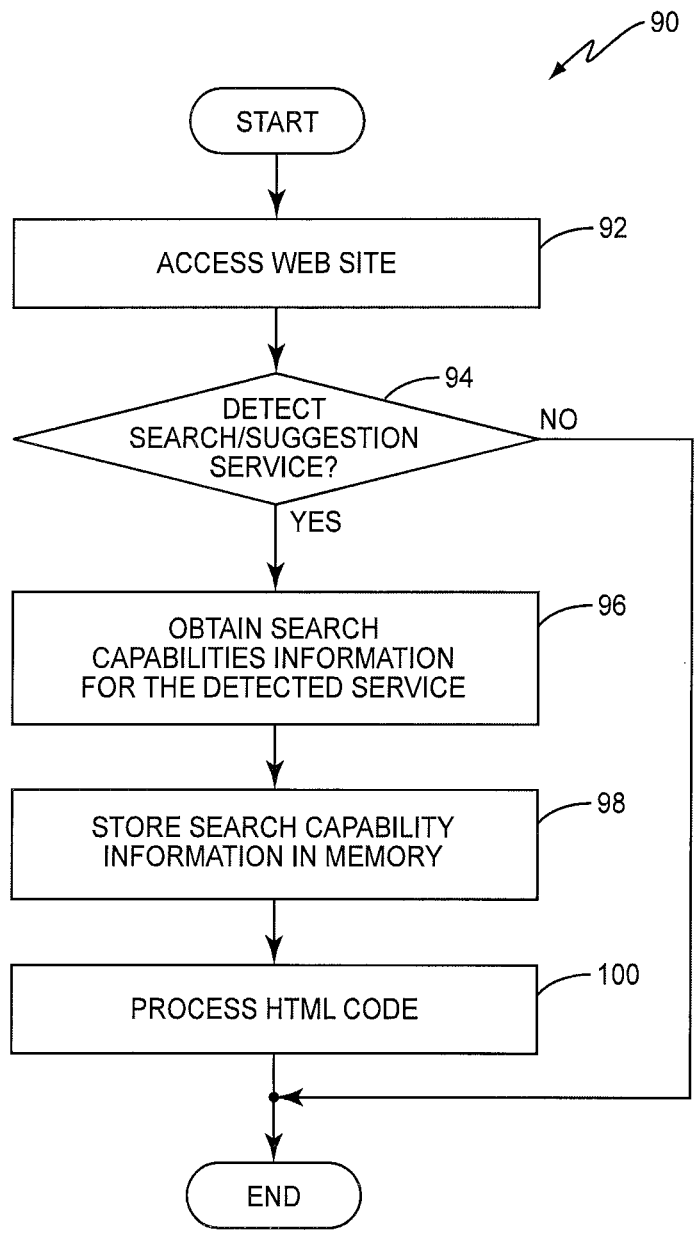
FIG. 6 is a flow diagram illustrating a method of performing the present invention according to one embodiment.

Once installed, the plug-in module 68 configures the browser 60 to save and use the information provided by the web site. FIG. 6 illustrates a method 90 in which the plug-in module 68 creates the library 62 of search engines/suggestion services for storage on memory 58. The library 62 may be updated with new capability information whenever the user visits a new web site, or with modified information whenever the user returns to a previously visited web site. Further, as described in more detail later, the user may specify that the browser 60 use a specific search engine/suggestion service from the library 62 whenever the user invokes the search function on the browser 60.

Method 90 begins with the user accessing a web site hosted by one of the servers 42, 44, 46 (box 92). As is known in the art, the browser 60 receives the HyperText Markup Language (HTML) code from the server 42, 44, 46 that defines the web-page and related data for presentation to the user on a display. The HTML code may, for example, comply with the standards defined in the HTML 4.01 Specification dated Dec. 24, 1999. The HTML specification, which is maintained by the World Wide Web Consortium (W3C), is incorporated herein by reference in its entirety. The particular web site visited by the user may or may not provide its own search/suggestion service. Therefore, the plug-in module 68 is configured to determine whether the web site provides such a service.

There are multiple ways of determining whether a visited web site provides such services. However, in one embodiment of the present invention, the plug-in module 68 analyzes the received HTML code received from the web site to detect the presence of an embedded indicator (box 94). For example, the plug-in module 68 may parse the HTML code received when the user visits the web page. If there is no indicator embedded in the HTML code, the plug-in module 68 determines that the web site does not provide a search/suggestion service, and the device 50 will simply process the received HTML code for presentation to the user (box 100). If an embedded indicator is present, browser 60 will obtain the information and data describing the search capabilities of the search engine/suggestion service from the web site identifying the search/suggestion service (box 96) and automatically save the information in the library 62 (box 98). The browser 60 will then process the HTML code for presentation to the user (box 100).

Identifying the search/suggestion services and saving the indicator to memory as a web site is visited is important because there are an extremely large number of web sites accessible to the user. Many web-sties will have their own search/suggestion service, and it would be unrealistic to pre-configure the browser 60 with the information for all such services. Therefore, by parsing the received HTML code whenever the browser 60 visits a web sites, the plug-in module 68 of the present invention avoids the need for pre-configuring the browser 60 with information identifying all the various services.

FIGS. 7A-7B illustrates how the browser 60 can automatically detect an embedded indicator identifying whether a given web-site provides a user with a search/suggestion service. As seen in FIG. 7A, that indicator comprises meta data embedded within the HTML code 110 that is sent to browser 60 when the user visits a web-site. The meta data may contain any information needed or desired to effect the auto-discovery of a search/suggestion service provided by the visited web-site; however, in this embodiment, the meta data is formatted to comply with the standards defined by OpenSearch.org. That standard, which is entitled, "OpenSearch 1.1," is published on the OpenSearch.org website "http://www.opensearch.org/Home," and is incorporated herein by reference in its entirety.

The meta data indicator in FIG. 7A comprises an HTML "link" element 112. The link element 112 conveys relationship information that may be rendered by the device 50. In this case, the link element 112 identifies a document 130, seen in FIG. 7B, that describes the search capabilities and the web interface of the search/suggestion service provided by the web-site. The link element 112 includes a plurality of attributes 114-120. These are the "rel" attribute 114, the "type" attribute 116, the "href" attribute 118, and the "title" attribute 120. Each of these elements and attributes 112-120 are fully described in the OpenSearch 1.1 and the HTML standards documents referenced previously. Therefore, they are not discussed in detail here.

The plug-in module 68 extracts and parses link element 112 from the HTML code 110 to determine the name and location of document 130 that defines the search capabilities and web interface of the search/suggestion service provided by the web-site. The plug-in module 68 then generates a request message to fetch the corresponding OpenSearch description document 130. As seen in FIG. 7B, the description document 130 is formatted according to the eXtended Markup Language (XML) specification, and contains multiple elements 132-134. Each of the elements 132-134 is fully described in the OpenSearch.org standard, and thus, their descriptions are not discussed in detail here. However, although not specifically shown in the Figures, those skilled in the art should note that the Open Search <OpenSearchDescription> element 132 may include a "xmlns" attribute containing the string, "http://a9.com/-/spec/opensearch/1.1/."

Figure 8:
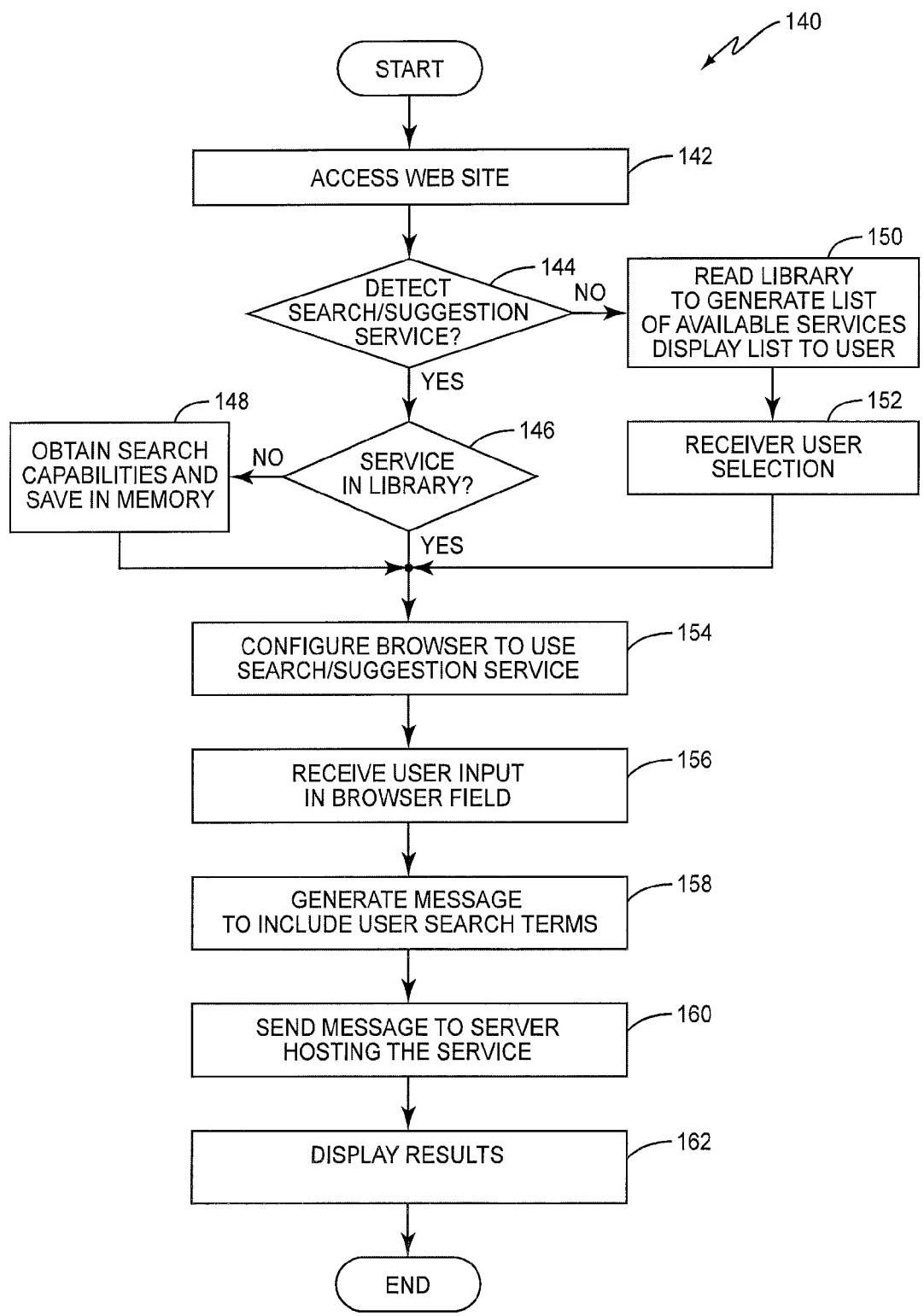
FIG. 8 is a flow diagram illustrating a method of performing the present invention according to one embodiment.

FIG. 8 illustrates a method 140 in which the plug-in module 68 configures the browser 60 to use a search/suggestion service provided by a web-site according to one embodiment of the present invention. Method 140 begins with the user invoking the browser application 60 with plug-in module 68 and visiting a desired web-site (box 142). As previously described, the plug-in module 68 analyzes the HTML code 110 received from the web site to automatically discover whether the web-site provides a search/suggestion service (box 144). If the plug-in module 68 detects an indicator indicating that the web-site provide such a service, the plug-in module 68 will search the library 62 for the corresponding XML document 130 (box 146). If the library 62 already contains the document 130 describing the search capabilities of the service provided by the web-site, the plug-in module 68 will read that information from memory 58 and configure the browser 60 to use that search engine/suggestion service whenever the user invokes the browser's search function (box 150). However, if the library 64 does not contain this information, the plug-in module 68 will obtain the XML document 130 and save it to the library 62, as previously described (box 148). The plug-in module will then configure the browser 60 to use the search engine/suggestion service whenever the user invokes the browser's search function (box 150).

Once configured, the user invokes the search function on the browser 60 by entering one or more characters into the combined input field 72 (box 152). The browser 60 may then generate a message including the terms entered into the combined input field 72 as search parameters (box 154). The browser 60 sends the message to the server hosting the search engine/suggestion service (156), and displays the results to the user upon receiving them from the service (box 158).

Figure 9:
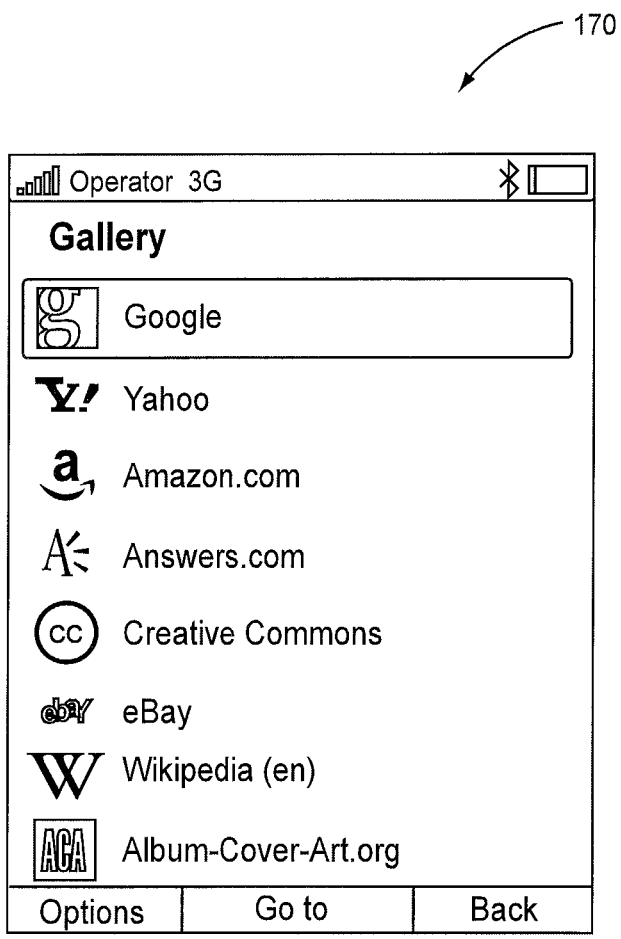
FIG. 9 is a perspective view illustrating a display screen on a wireless communication device configured to operate according to one embodiment of the present invention.

In the embodiment of FIG. 8, the plug-in module 68 first checks to determine whether the web site provides a service for the user, and by default, uses that service when the user invokes the search function on browser 60. However, as previously stated, the user is able to select a service to use from the library 62. FIG. 9 illustrates a list 160 containing the search engines/suggestion services having capability information stored in device 50. Some examples of the services include, but are not limited to, GOOGLE, YAHOO, AMAZON.COM, ANSWERS.COM, CREATIVE COMMONS.COM, EBAY.COM, WIKIPEDIA, and ALBUM-COVER-ART.ORG. To activate the list 160, the user could actuate an icon or other command object displayed on the touch-screen display. From the list 160, the user would select a desired service. Responsive to the selection, the plug-in module 68 would configure the browser 60 to send the generated search messages to the web site associated with the selected service.

Those skilled in the art will appreciate that the plug-in module 68 may be configured to automatically select a service for the user based on a variety of criteria. For example, in one embodiment, the plug-in module 68 is configured to always use the service identified by a visited web site before using any of the services defined in the library 62. This ensures that the user will have the most up-to-date search capabilities for the web site being visited. In other embodiments, however, the plug-in module 68 is configured to enhance the search engine/suggestion service of a given web site with another service selected by the user from library 62. In other embodiments, the plug-in module 68 could give priority to the service provided by the currently visited web site, another service defined in library 62, or configure a browser 60 to use multiple services and then combine the results for the user. Such prioritization may be based on user preferences, for example, or on statistics gathered by the plug-in module 68 and/or browser 60 during operation.

The present invention may, of course, be carried out in other ways than those specifically set forth herein without departing from essential characteristics of the invention. For example, the previous embodiments describe the present invention in the context of a plug-in module that extends the functionality of browser 60. However, those skilled in the art will appreciate that the invention is not so limited. In one embodiment, for example, the browser 60 is written to include the code to perform the functionality of the present invention. In such embodiments, browser 60 may not require a plug-in module to extend its functionality. In another embodiment, the code necessary for performing the present invention is split between the browser 60 and the plug-in module. Therefore, the present embodiments are to be considered in all respects as illustrative and not restrictive, and all changes coming within the meaning and equivalency range of the appended claims are intended to be embraced therein.

What is claimed is:

1. A method of selecting a search engine on a wireless communication device, the method comprising:
    establishing a communication link between a wireless communication device and a network server hosting a web site;
    automatically detecting, at the wireless communication device, whether the web site provides a search engine based on data received from the web site;
    configuring a browser application executing on the wireless communication device to perform a search using the detected search engine responsive to detecting that the web site provides the detected search engine; and
    displaying the results of the search at the wireless communication device;
    wherein automatically detecting whether the web site provides a search engine comprises determining whether the data received from the web site includes an embedded indicator, and wherein the embedded indicator comprises meta data received from the web site via the established communication link, and identifies a file that defines the search capabilities of the detected search engine.

2. The method of claim 1 further comprising downloading the file defining the search capabilities of the detected search engine, and storing the search capabilities in memory on the wireless communication device.

3. The method of claim 1 wherein configuring the browser application to perform a search using the detected search engine comprises:
    receiving user input at an input field of the browser application;
    generating a message to include the user input as one or more search parameters;
    sending the message to the detected search engine at the web site; and
    receiving the results of the search at the wireless communication device.

4. The method of claim 1 further comprising storing a search capability file in memory of the wireless communication device for each web site visited by the user that provides a search engine.

5. The method of claim 4 further comprising:
    generating a list of search engines based on one or more of the search capability files stored in memory, and displaying the list to the user at the wireless communication device;
    selecting a search engine from the list responsive to user input; and
    configuring the browser to perform the search using the selected search engine.

6. A wireless communication device comprising:
    a communication interface to communicate with a web site via an established communication link;
    a processing circuit configured to:
        establish the communication link between the communication interface and a network server hosting the web site;
        automatically detect whether the web site provides a search engine based on data received from the web site; and
        configure a browser application executing on the wireless communication device to perform a search using the detected search engine;
    a user interface to display the results of the search; and
    wherein the processing circuit is configured to automatically detect whether the data received from the web site includes an embedded indicator, and wherein the embedded indicator comprises meta data received from the web site via the established communication link, and identifies a file that defines the search capabilities of the detected search engine.

7. The device of claim 6 wherein the processing circuit is configured to download the search capabilities of the search engine from the web site, and further comprising memory to store the search capabilities of the detected search engine.

8. The device of claim 6 wherein the processing circuit is configured to:
    receive user input at an input field of the browser application;
    generate a message to include the user input as one or more search parameters;
    send the message to the detected search engine at the web site; and
    receive the results of the search at the wireless communication device.

9. The device of claim 6 further comprising memory, and wherein the processing circuit is configured to store a search capability file for each web site visited by the user that provides a search engine.

10. The device of claim 9 wherein the processing circuit is configured to:
    generate a list of search engines based on one or more of the search capability files stored in memory;
    display the list to the user at the wireless communication device;
    select a search engine from the list responsive to user input; and
    configure the browser application to perform the search using the selected search engine.

11. A wireless communication device comprising:
    a communication interface to communicate with a web site via an established communication link;
    memory to store instructions comprising a browser application; and
    a processing circuit configured to execute the browser application to:
        establish the communication link with a network server hosting the web site via the communication interface;
        automatically detect whether the web site provides a search engine based on an embedded indicator received from the web site, wherein the embedded indicator identifies a file on a network server that defines the search capabilities of the detected search engine;

download the file from the server; and configure a context-sensitive search function provided by the browser application to perform a search using a search engine identified by the web site.

12. The wireless communication device of claim 11 wherein the processing circuit is further configured to execute the browser application to:

store information identifying the search capabilities of the search engines of one or more web sites in memory;

display a list of the search engines based on the stored search capabilities;

identify one or more selected search engines from the list; and re-configure the search function at the browser to perform a search using the identified one or more search engines.

13. The wireless communication device of claim 11 further comprising a module that interfaces with the browser application to configure the context-sensitive search function at the browser application to use the detected search engine.

\* \* \* \* \*